United States Patent [19]
Watson, Jr.

[11] 4,077,559
[45] Mar. 7, 1978

[54] OVAL BELL CONCEPT

[75] Inventor: James J. Watson, Jr., McMinnville, Tenn.

[73] Assignee: Carrier Corporation, Syracuse, N.Y.

[21] Appl. No.: 726,862

[22] Filed: Sep. 27, 1976

[51] Int. Cl.$^2$ ............................ B23K 1/12; B23K 1/06
[52] U.S. Cl. .................................... 228/154; 228/165; 228/173 F; 228/183; 29/157.6
[58] Field of Search .................... 228/183, 154, 173 F, 228/165; 29/157.6; 285/287

[56] References Cited

U.S. PATENT DOCUMENTS

| | | | |
|---|---|---|---|
| 2,460,667 | 2/1949 | Wurzburger | 285/287 X |
| 3,897,821 | 8/1975 | Babunovic et al. | 29/157.4 X |
| 3,957,289 | 5/1976 | Kilgore et al. | 228/165 X |

*Primary Examiner*—Gary L. Smith
*Assistant Examiner*—K. J. Ramsey
*Attorney, Agent, or Firm*—J. Raymond Curtin; Robert P. Hayter

[57] ABSTRACT

This invention relates to apparatus for facilitating the construction of a heat exchanger, such as a condenser or evaporator employed in an air conditioning system, wherein exchanger tubes extending through a plate fin assembly are joined together by means of return bend connections or the like. The ends of the tube are provided with an oval shaped bell in which are telescoped the return bends. Diametrically opposed nibs are formed on the outer surface of the return bend connectors near the distal end thereof. The outside diameter over the nibs is slightly larger than the minor inside diameter of the oval bell. The nibs are inserted into the bell aligned along the minor diameter of the opening. The nibs are thus caused to ride in engagement against the wall of the bell to frictionally support the connector in assembly. The joint is then immersed in a molten solder bath whereby solder flows freely into the joint region along the major axis to create a highly reliable joint.

4 Claims, 4 Drawing Figures

U.S. Patent    March 7, 1978    4,077,559
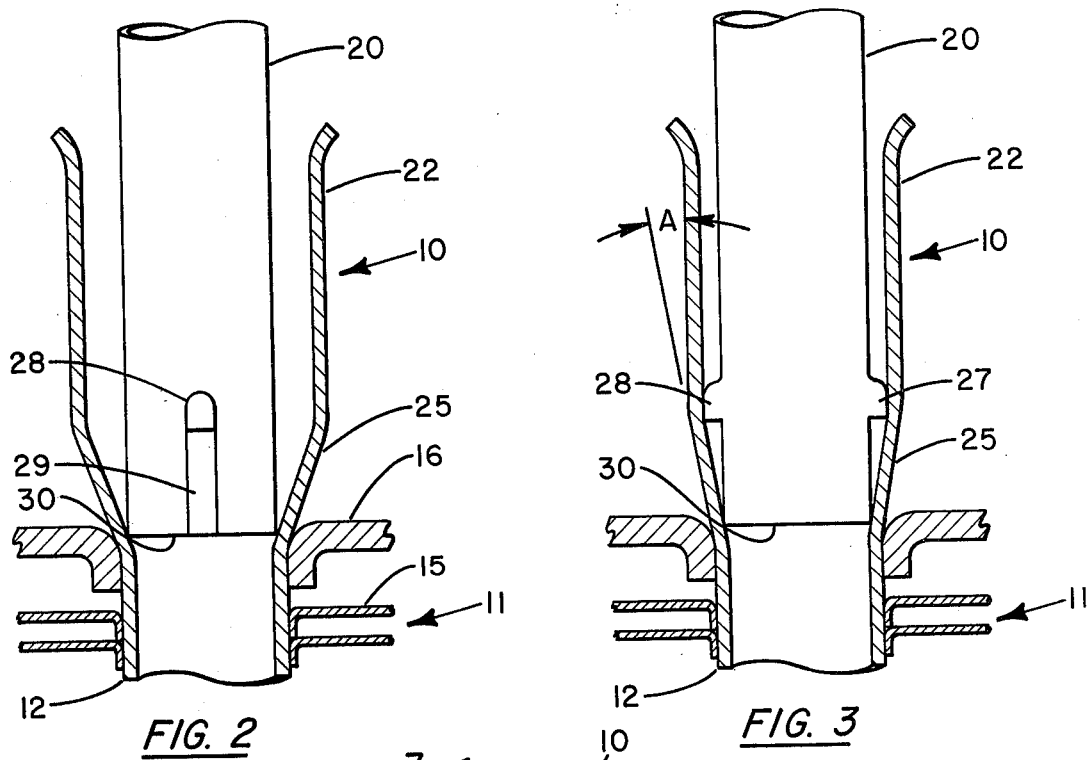
FIG. 2
FIG. 3
FIG. 1
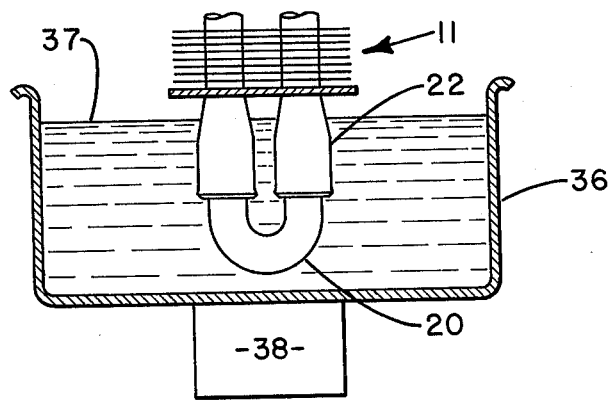
FIG. 4

OVAL BELL CONCEPT

BACKGROUND OF THE INVENTION

This invention relates to a bell and spigot joint arrangement for facilitating the assembling of a heat exchanger and, in particular, a heat exchanger utilizing aluminum tubes and tube connectors.

The joints between tubular components of a heat exchanger as commonly utilized in an air conditioning system must provide a high strength fluid tight seal. The soldering of this type of joint, particularly where one or both of the components making up the joint are formed of aluminum, has presented a number of problems in the art. With the advent of the ultrasonic dip soldering process, some of these problems have been alleviated. However, the configuration of most generally employed tubular joints will not allow the male member to penetrate deeply into the bell while at the same time providing for a relatively free flow of solder material into the deep joint region.

SUMMARY OF THE INVENTION

It is, therefore, an object of the present invention to improve the joints formed between tubular components.

A further object of the present invention is to facilitate the joining of aluminum tubular components in a heat exchanger assembly.

A still further object of the present invention is to provide a bell and spigot joint wherein the male member is deeply seated within the bell and solder is allowed to freely move into the deep joint region.

These and other objects of the present invention are attained by means of a tubular joint including a male member and female member, the male member having a pair of diametrically opposed nibs formed close to one end thereof which project outwardly from the surface of the male member, and the female member having an oval bell formed in the end thereof having a major inside diameter which is substantially greater than the outside diameter of the male member, and a minor inside diameter which is slightly less than the diametrical overall distance across the nibs whereby interference engagement is provided between the male and female member when the male member is inserted within the oval bell with the nibs aligned along the minor axis thereof.

BRIEF DESCRIPTION OF THE DRAWINGS

For a better understanding of the present invention as well as other objects and further features thereof reference is had to the following detailed description of the invention to be read in connection with the accompanying drawings, wherein:

FIG. 1 is a top view of a tube joint illustrating a male member inserted within an oval shaped bell formed in a second member;

FIG. 2 is a partial view in section taken along the major diameter of the bell shown in FIG. 1 and further illustrating the second member being contained within a plate fin heat exchanger;

FIG. 3 is a partial view in section taken along the minor axis of the bell shown in FIG. 1 also further illustrating the second joint member being carried within a plate fin heat exchanger; and FIG. 4 is a cross sectional view of a plate fin heat exchanger employing the joint of the present invention being treated in a molten bath of solder.

DESCRIPTION OF THE PREFERRED EMBODIMENT

Referring initially to FIGS. 1 through 3, there is shown a tube joint generally referenced 10 employed in a heat exchanger 11. The heat exchanger can be of the plate fin type wherein a number of parallel rows of tubes, such as tube 12, are extended transversely through a plurality of spaced apart plate fins 15 supported between two planar tube sheets 16 (only one of which is shown) to form what is known as "plate fin coil". The ends of the tube 12 are brought through one of the tube sheets and the ends of the tubes connected by U-shaped return bends connectors 20 or any other suitable connector element, such as cross-over tubes, header tubes or the like, to complete one or more flow circuits passing through the plate fin coil.

As best illustrated in FIGS. 2 and 3, the outer ends of the tubes passing through the tube sheet are expanded outwardly to form what is herein referred to as an oval bell 22 having a major axis 23 and a minor axis 24 (FIG. 1). The bottom portion of the oval is necked or taped down at a given angle "A" in reference with the axial center line of tube 12. The neck 25 terminates at about the point where the tube passes through the tube sheet. In practice, a conventional straight walled bell is first formed in the end of the tube utilizing standard tooling. Upon formation of the standard bell, an oval shaped punch or bullet is passed into the bell to finish the bell geometry without collapsing the tube column.

The return bend 20, or any other suitable connector, is provided with diametrical opposed nibs 27, 28 which protrude outwardly in a radial direction from the surface of the connector tube. The dependent nibs are formed by scarving a groove 29 axially within the end of the connector tube. Sufficient metal is displaced or pushed back during the groove forming operation to create the two nibs. The nib forming operation is controlled so that the diametral distance over the nibs is brought to a desired dimension. This diametral dimension is slightly larger than the inside minor diameter of the oval bell. A slight interference is thus obtained when the male member is inserted into the bell with the nibs aligned along the minor axis as shown in FIG. 1.

In assembly, the distal end 30 of the connector 20 is passed into the necked down portion of the bell and seated tightly against the inside wall of the neck 25 adjacent to the tube sheet. By maintaining the angle of the taper between 10° and 30°, a void is estalished about the end of the male connector for accepting solder during the joint forming operation. Similarly, by providing taper in this region, the male member can be deeply seated within the bell thus reducing the possibility of the filler material entering the tubes during the joint forming operation.

As best seen in FIG. 1, when the male member is seated in the bell as described above, two generous flow passages 33, 34 are established along the major diameter of the bell between the outer surface of the male member and the interior wall of the bell. These generous openings allow solder to freely flow into the entire joint region.

With the male connector inserted with the oval bell as shown, the nibs engage the inner surface 35 (FIG. 1) of the bell so as to center the male member therein and thus seats the distal end of the male connector in continuous contact against the tapered bell region. As illustrated in FIG. 3, upon completion of the assembly, the joint or joints are passed into a solder pot 36 containing a bath of molten solder 37 or any other suitable filler material or alloy thereof. One or more transducer elements 38 are affixed to the bottom wall of the solder pot which, upon actuation, create ultrasonic vibrations within the liquid bath material. As can be seen, the generous openings formed along the major axis of the bell allows the liquid solder to freely flow into the tapered regions so as to establish a complete filling of the joint with molten metal. Applying ultrasonic energy to the bath brings the energy to the joint region where it acts to break down any unwanted oxides which form on the tube surface. This, in turn, permits the solder to wet the tube surfaces and thus produce good metallurgical bonding resulting in the formation of a reliable joint.

The use of the oval bell arrangement in conjunction with the ultrasonic dip soldering process provides for the efficient bonding of the tubular elements particularly when one or more of the elements are formed of aluminum or aluminum based alloys. As should be clear from the disclosure above, when the male member is frictionally secured in the bell and the bell immersed in the bath, the grooves 29 formed below the nibs 27, 28 vent the soldering cavity to the interior of the tubular elements. Accordingly, any gases generated during the soldering operation are passed into the tubes from where they can be drawn in a manner known and used in the art.

While this invention has been described with reference to the structure herein disclosed, it is not confined to the details as set forth and this application is intended to cover any modifications or changes that may come within the scope of the following claims.

I claim:

1. The method of joining tubular components including forming an oval bell in the end of one member having an internal major and minor axis, forming a pair of diametrically opposed nibs on the outer surface of a second tubular member, bringing the second tubular member into telescoping engagement with the oval bell formed in the first member with the nibs of the second member in interference engagement with the interior wall of the bell along the minor axis thereof, such that a space for solder entry remains between the outer surface of the second tubular member and the inner surface of the oval bell along the major axis thereof, and bringing molten solder filler material into the joint region and thereafter permitting said filler to solidify.

2. The method of claim 1 wherein filler material is flowed into the joint region by immersing the joint within a bath of molten filler material.

3. The method of claim 2 wherein the molten solder bath is treated with ultrasonic energy when the joints are immersed therein.

4. The method of claim 3 further including the step of venting hot gasses generated during the joining operation from the joint region.

* * * * *